(12) United States Patent
Sivarajan et al.

(10) Patent No.: US 9,214,256 B2
(45) Date of Patent: Dec. 15, 2015

(54) CARBON NANOTUBE-TRANSPARENT CONDUCTIVE INORGANIC NANOPARTICLES HYBRID THIN FILMS FOR TRANSPARENT CONDUCTIVE APPLICATIONS

(75) Inventors: Ramesh Sivarajan, Shrewsbury, MA (US); Henning Richter, Dorchester, MA (US); Viktor Vejins, Concord, MA (US)

(73) Assignee: Nano-C, Inc., Westwood, MA (US)

( * ) Notice: Subject to any disclaimer, the term of this patent is extended or adjusted under 35 U.S.C. 154(b) by 861 days.

(21) Appl. No.: 12/404,829

(22) Filed: Mar. 16, 2009

(65) Prior Publication Data

US 2010/0047522 A1 Feb. 25, 2010

Related U.S. Application Data

(60) Provisional application No. 61/036,755, filed on Mar. 14, 2008.

(51) Int. Cl.
| | | |
|---|---|---|
| *B32B 9/00* | (2006.01) | |
| *H01B 1/18* | (2006.01) | |
| *C01B 31/02* | (2006.01) | |
| *C08L 1/28* | (2006.01) | |
| *C09J 101/28* | (2006.01) | |

(52) U.S. Cl.
CPC ............... *H01B 1/18* (2013.01); *C01B 31/022* (2013.01); *C01B 31/0293* (2013.01); *C08L 1/284* (2013.01); *C09J 101/284* (2013.01); *Y10T 428/24372* (2015.01); *Y10T 428/25* (2015.01); *Y10T 428/30* (2015.01)

(58) Field of Classification Search
CPC .. C01B 31/022; C01B 2202/00; Y10T 428/30
USPC ............. 428/408; 423/447.1, 447.2; 165/185; 264/29; 977/742
See application file for complete search history.

(56) References Cited

U.S. PATENT DOCUMENTS

| | | |
|---|---|---|
| 5,424,054 A | 6/1995 | Bethune et al. |
| 5,908,585 A | 6/1999 | Shibuta et al. |
| 5,985,232 A | 11/1999 | Howard et al. |
| 6,221,330 B1 | 4/2001 | Moy et al. |
| 6,988,925 B2 | 1/2006 | Arthur et al. |
| 7,045,087 B2 | 5/2006 | Kotov |

(Continued)

FOREIGN PATENT DOCUMENTS

| | | |
|---|---|---|
| JP | 11-353947 | 12/1999 |
| JP | 2003-123860 A | 4/2003 |

(Continued)

OTHER PUBLICATIONS

International Search Report for corresponding International Patent Application No. PCT/US2009/037259 mailed Jan. 18, 2010 (3 pages).

(Continued)

*Primary Examiner* — Daniel H Miller
(74) *Attorney, Agent, or Firm* — Wilmer Cutler Pickering Hale and Dorr LLP

(57) ABSTRACT

An optically transparent, electrically conductive hybrid film includes a carbon nanotubes network deposited on a substrate, and a population of transparent conductive inorganic nanoparticles distributed throughout the carbon nanotubes network to provide a conductive transparent hybrid film.

27 Claims, 14 Drawing Sheets

(56) References Cited

U.S. PATENT DOCUMENTS

| | | |
|---|---|---|
| 7,060,241 B2 | 6/2006 | Glatkowski |
| 7,750,071 B2 | 7/2010 | Carroll et al. |
| 2003/0122111 A1* | 7/2003 | Glatkowski .................. 252/500 |
| 2005/0166960 A1 | 8/2005 | Jin et al. |
| 2006/0137741 A1 | 6/2006 | Park et al. |
| 2007/0120095 A1 | 5/2007 | Gruner |
| 2008/0001141 A1 | 1/2008 | Gruner et al. |
| 2008/0143906 A1* | 6/2008 | Allemand et al. .............. 349/43 |
| 2009/0266580 A1 | 10/2009 | Jung et al. |
| 2010/0098902 A1* | 4/2010 | Kotov et al. ................. 428/105 |

FOREIGN PATENT DOCUMENTS

| | | |
|---|---|---|
| JP | 2006-035722 A | 2/2006 |
| JP | 2007-250465 A | 9/2007 |
| JP | 2007-297255 A | 11/2007 |
| JP | 2008-507080 A | 3/2008 |
| JP | 2009-115334 A | 5/2009 |
| KR | 10-1999-0029225 | 4/1999 |
| KR | 10-0549051 | 2/2006 |
| KR | 10-2008-0001333 | 1/2008 |
| WO | WO-9715935 A1 | 5/1997 |
| WO | WO-2007015710 A2 | 2/2007 |
| WO | WO-2009083562 A1 | 7/2009 |

OTHER PUBLICATIONS

R.G.Gordon, "Criteria for Choosing Transparent Conductors," MRS Bulletin: 52-57 (Aug. 2000).

Guo, et al., "Catalytic Growth of Single-Walled Nanotubes by Laser Vaporization," Chem. Phys. Lett. 243: 49-54 (1995).

Thess, et al., "Crystalline Ropes of Metallic Carbon Nanotubes," Science, 273: 483-487 (1996).

Matijevic, "Interactions in Mixed Colloidal Systems (Heterocoagulation, Adhesion, Microflotation," Pure & Appl. Chem., 1981, vol. 53, pp. 2167-2179.

Whitsitt et al., "Silica Coates Single Walled Carbon Nanotubes," Nano Letters, 2003, vol. 3, No. 6, pp. 775-778.

Dijkstra et al., "Sedimentation of binary mixtures of like- and oppositely charged colloids: the primitive model or effective pair potentials," J. Physics: Condensed Matter, 2006, pp. 825-836.

Estili et al., "An approach to mass-producing individually alumina-decorated multi-walled carbon nanotubes with optimized and controlled compositions," Science Direct, 2008, pp. 906-909.

Castro, et al., "Enhanced Mechanical and Electrical Properties of Antimony-Doped Tin Oxide Coatings," Semicond. Sci. Technol., vol. 23, pp. 1-5 (2008).

Castro, et al., "Transparent Conducting Antimony-doped Tin Oxide Films Containing Functionalized Multi-walled carbon Nanotubes," Phys. Stat. Sol, vol. 204, No. 10, pp. 3380-3386 (2007).

Supplementary European Search Report Issued by the European Patent Office in European Application No. EP09767143 dated Jan. 31, 2014 (4 pgs.).

Office Action issued by the Korean Intellectual Property Office for Korean Application No. 10-2010-7023014 dated Feb. 12, 2015 (19 pages).

* cited by examiner

CARBON NANOTUBE-TRANSPARENT CONDUCTIVE INORGANIC NANOPARTICLES HYBRID THIN FILMS FOR TRANSPARENT CONDUCTIVE APPLICATIONS

CROSS REFERENCE TO RELATED APPLICATIONS

This application claims the benefit of U.S. Patent Application No. 61/036,755, filed on Mar. 14, 2008

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND OF THE INVENTION

The disclosed subject matter is in the field of transparent conductive coatings for display and touch screen applications.

Indium tin oxide (ITO) coatings on polyester films (like PET) are commercially available and face a major technical hurdle in their implementation with flexible display applications due to the poor mechanical strength of the ITO film and its rapid mechanical failure on flexing.

On the other hand carbon nanotube (CNTs) based films have been gaining importance in recent times as potential replacement for ITO in transparent conductive applications. The major advantage of carbon nanotubes is their electrical conductance, even in the form of a few nanometers thick film, coupled with their extreme mechanical flexibility. Since robust CNT films can be made at extremely small thicknesses, e.g., a CNT monolayer, the resulting films can be transparent and conductive. However, dense CNT networks cannot be made except with a loss in the optical transparencies because CNTs are intrinsically light absorbing in the visible and UV regions.

Depositing a single dispersion of transparent conductive oxide particles with carbon nanotubes have been proposed. However, realization of such methodology is thought to be extremely difficult due to flocculation of the various species during dispersion formation and/or during coating.

Laminates of transparent conductive oxide layers with carbon nanotubes layers have also been proposed. However, such structure nevertheless suffers from the respective problems associated with the single carbon nanotube (e.g., poor optical transparencies) and single transparent conductive oxide films (e.g., poor mechanical strengths) noted above.

SUMMARY

A carbon nanotube-transparent conductive inorganic nanoparticle (CNT-TCIN) hybrid film is provided that inherits the relative advantages of each of the individual components while overcoming the technical disadvantages of both the films.

For example, while transparent conductive oxide (TCO) films exhibit poor mechanical strength, CNT-TCIN hybrid films exhibit excellent mechanical strength. While TCO films exhibit a narrow electrical conductance range (e.g., films having more than 5,000 ohms/square are non-uniform), CNT-TCIN hybrid films exhibit wide range of electrical conductance (e.g., $1\text{-}10^{10}$ ohms/square). While TCO films are not color neutral, CNT-TCIN hybrid films are color neutral. While TCO films are expensive and difficult to form because they are formed via sputtering, CNT-TCIN hybrid films can be formed via simple, inexpensive solution deposition techniques. While TCO films exhibit poor RF absorption properties, CNT-TCIN hybrid films exhibit good RF absorption properties and are useful in military applications, antennas, and tags. While TCO films exhibit poor environmental stability and many adhesion failures occur due to moisture and temperature, CNT-TCIN hybrid films exhibit good stability at extreme moisture and temperatures without suffering adhesion failures. Lastly, while TCO films exhibit low charge carrier mobility (in the range of $1\text{-}100\,\text{cm}^2/(\text{V s})$), CNT-TCIN hybrid films can exhibit high charge carrier mobility in optoelectronic devices and transparent field effect transistors because the intrinsic hole mobility of CNT films can be as high as $10^5\,\text{cm}^2/(\text{V s})$.

Moreover, while the visible light transmittance is acceptable for only a certain number of applications in CNT films, CNT-TCIN hybrid films exhibit good visible light transmittance for many applications. While infrared reflectance is poor for CNT films and excellent for TCO films, CNT-TCIN hybrid films can be tuned for applications ranging from heat mirrors in buildings to optical modulators. While the surface roughness for CNT films typically cannot be decreased to a RMS roughness of less than about 3.5 nm due to the bundling of the CNTs, CNT-TCIN hybrid films can exhibit lower surface roughness.

The present invention further describes methods for forming a CNT-TCIN hybrid film.

In one aspect, a conductive carbon nanotube layer includes a layer of carbon nanotubes deposited on a substrate to form a conductive and transparent CNT network, hybridized by a population of TCINs distributed throughout the network in an amount and at a location to provide a conductive transparent layer.

In one or more embodiments, the layer further includes a coating of colloidal transparent conductive inorganic nanoparticles disposed on the upper surface of the layer, said colloidal transparent conductive nanoparticles having a particle size less than the transparent conductive inorganic nanoparticles.

In another aspect, a method of preparing a composite carbon nanotube layer includes providing a first suspension of carbon nanotubes in a first solvent; providing a second suspension of transparent conductive inorganic nanoparticles in a second solution; applying the carbon nanotubes to a substrate to form a carbon nanotube network; and applying the colloidal transparent conductive inorganic nanoparticles to the substrate to form a carbon nanotube network/transparent conductive inorganic nanoparticles hybrid layer.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

The formation of carbon nanotube-transparent conductive oxide hybrid coatings on flexible plastic substrates, rigid plastic substrates and glass substrates is described.

Figure 1:
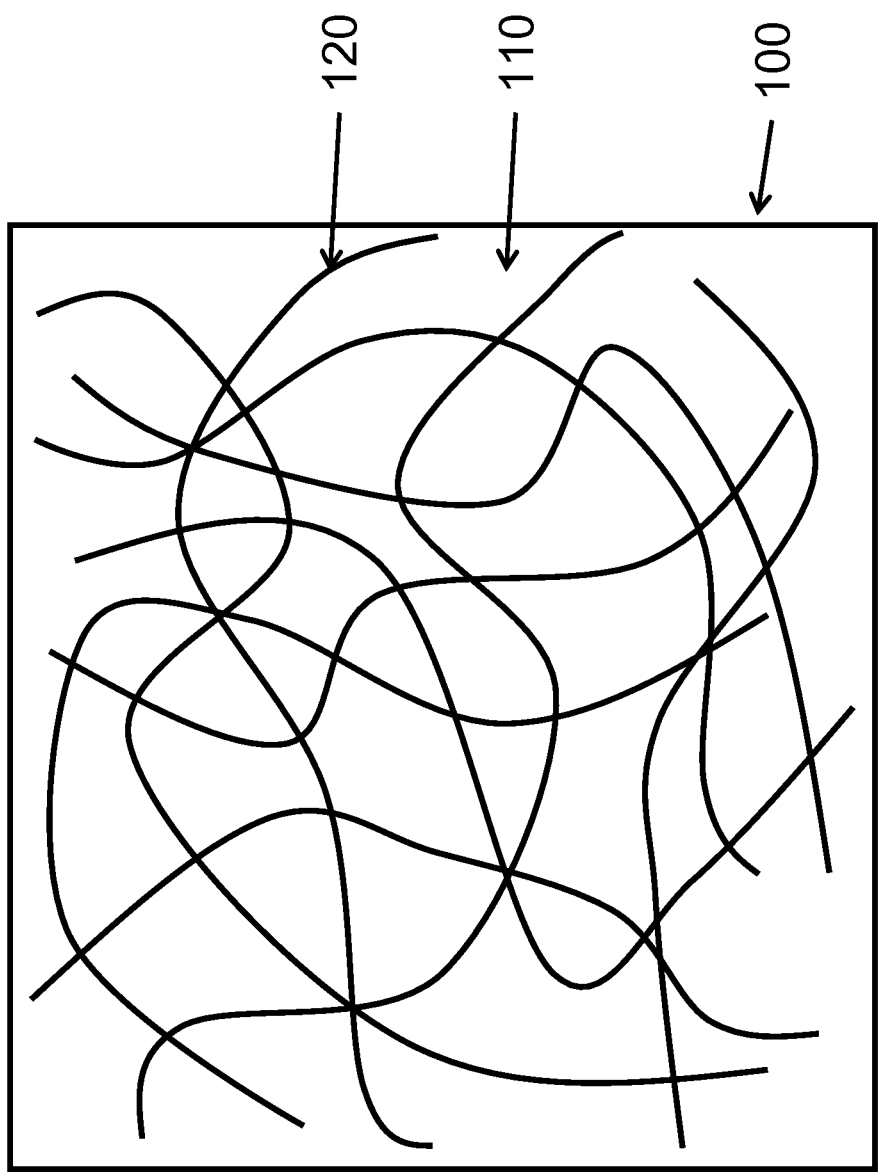
FIG. 1 is a schematic drawing of a monolayer of carbon nanotubes, thin bundles, deposited on a transparent substrate.
Figure 2:
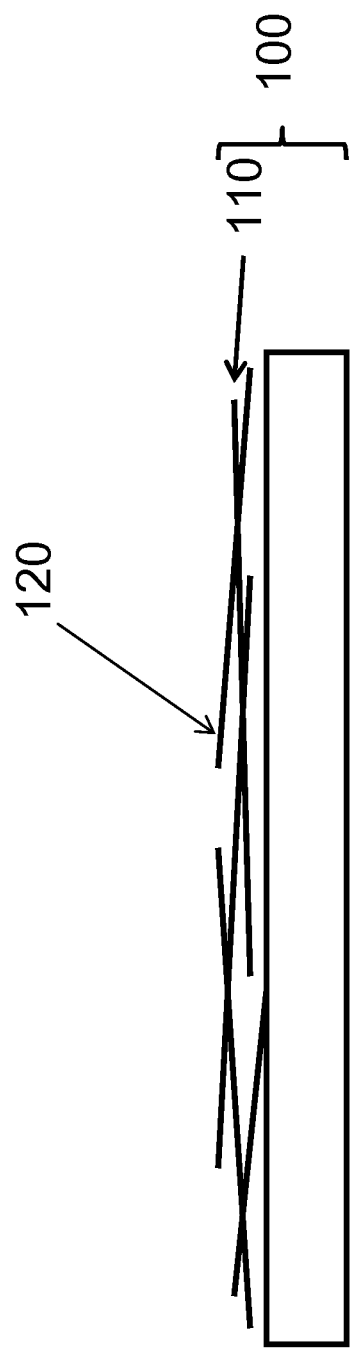
FIG. 2 is a schematic cross sectional view of a monolayer of carbon nanotubes deposited on a transparent substrate.

FIG. 1 is a schematic illustration of a monolayer of carbon nanotubes, thin bundles deposited on a transparent substrate and is illustrative of conventional conductive transparent CNT films. FIG. 2 is a cross sectional view of the same CNT layer deposited on a transparent substrate. The thin film system 100 includes a transparent substrate layer 110 onto which a monolayer of carbon nanotubes 120 are deposited. The layer can be very thin, for example, a CNT monolayer can be about 1.35 nm thick.

Structure of CNT-TCIN Hybrid Films

Figure 3:
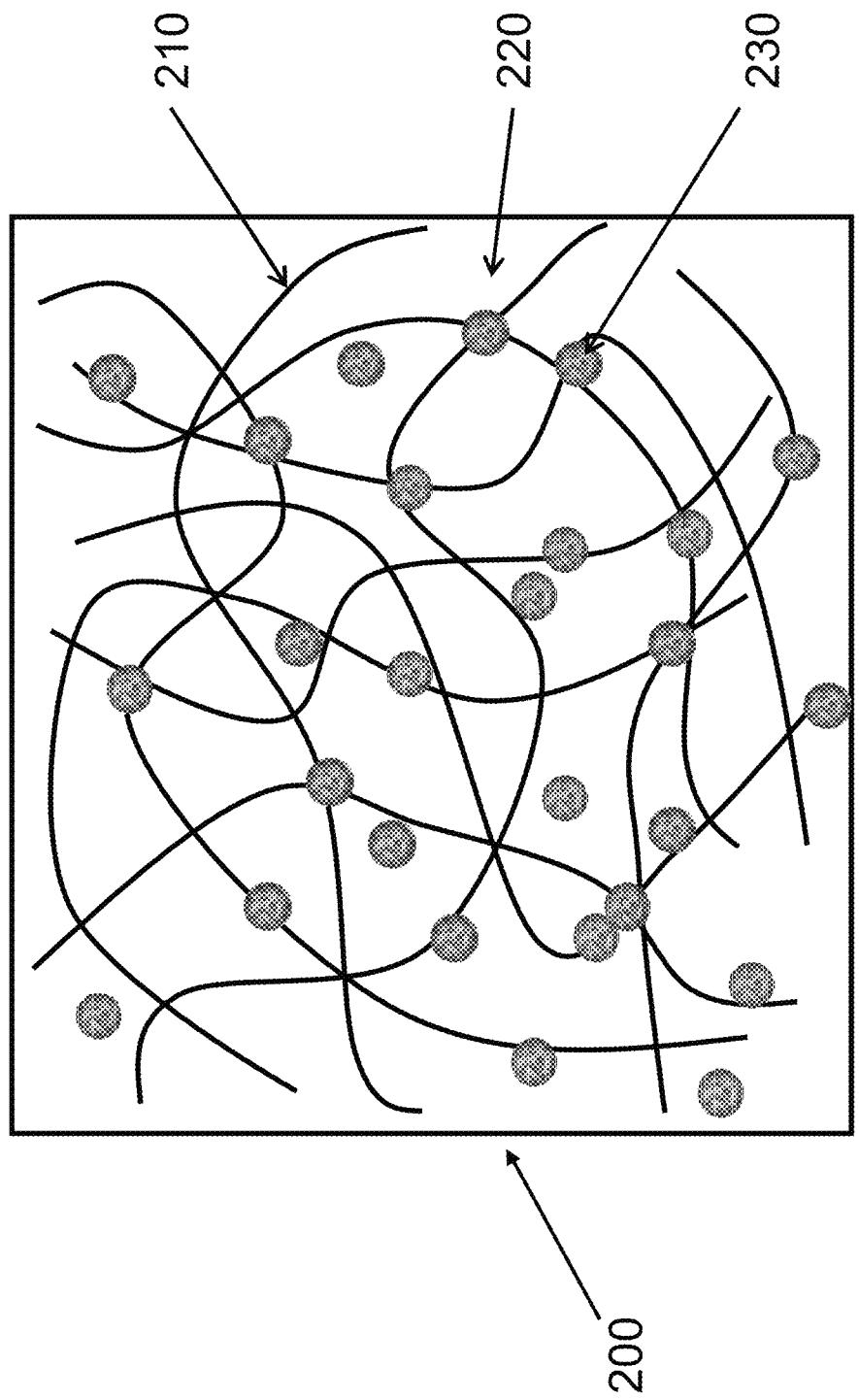
FIG. 3 is a schematic drawing of a monolayer of carbon nanotubes deposited on a transparent substrate followed the deposition of transparent conductive inorganic nanoparticle monolayer (TCIN)
Figure 4:
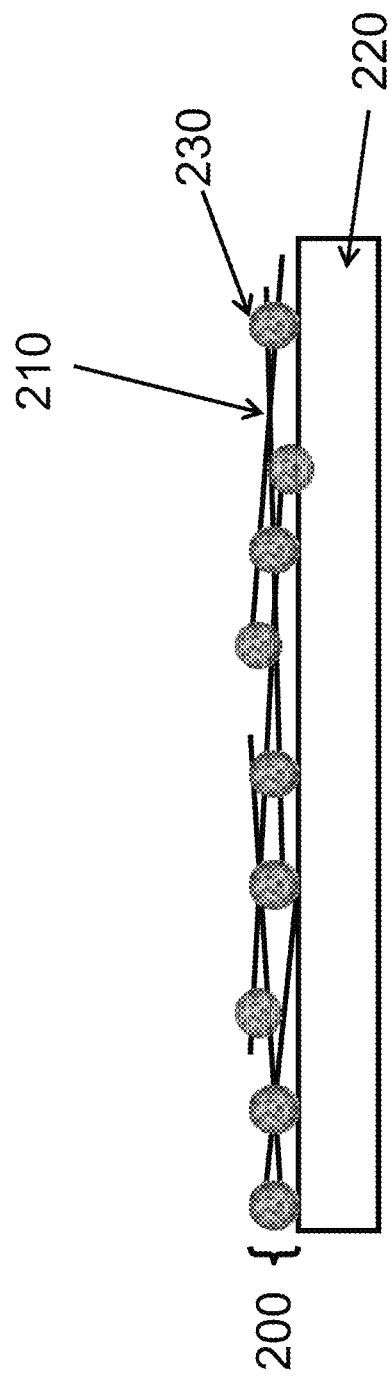
FIG. 4 is a schematic cross sectional view of a monolayer of carbon nanotubes deposited on a transparent substrate followed the deposition of transparent conductive inorganic nanoparticle monolayer (TCIN)

Flexible thin films of high conductivity and optical transmission are provided by introduction of TCINs into the CNT network. FIG. 3 is a top view and FIG. 4 is a cross sectional view of a hybrid layer 200 including a monolayer of carbon nanotubes 210, as part of the hybrid, arranged in thin bundles, deposited on a transparent substrate 220. The hybrid layer further includes small transparent conductive inorganic nanoparticles (TCINs) 230 that are distributed throughout the CNT monolayer 210. In one or more embodiments, the introduction of the TCINs occurs after the deposition of the CNT monolayer. A single hybrid layer can have a thickness up to about 20 nm, and can be up to 10 nm in thickness and is for example about 2-5 nm thick.

Figure 5:
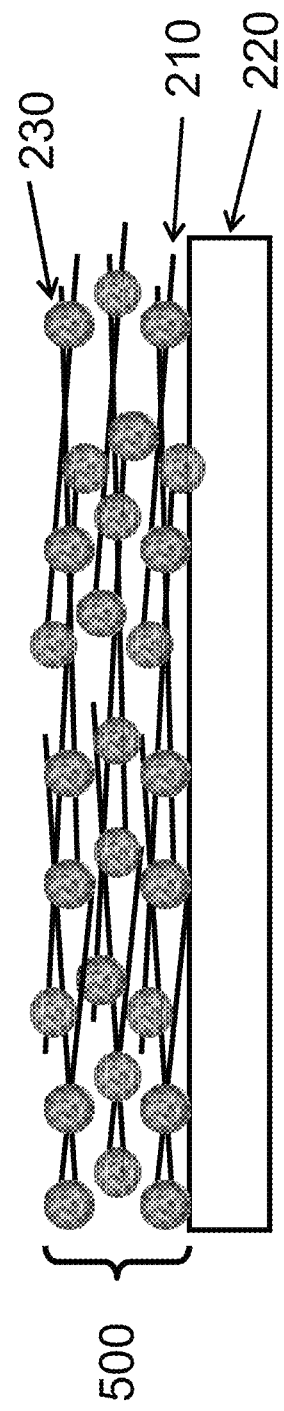
FIG. 5 is a schematic cross sectional view of carbon nanotubes-TCIN hybrid films formed on a transparent substrate through multiple depositions.

FIG. 5 is a schematic cross sectional view a CNT-TCIN hybrid film 500 of increased thickness. The hybrid multilayers can range from moderately thick to very thin. For example, the films can have a thickness between about 5 nm to about 100 nm. In a preferred embodiment, the films can have a thickness between about 20 nm to about 25 nm.

As shown in FIGS. 3-5, the hybrid film contains a nanoscale hybrid of nanoparticles of transparent conductive oxides (TCO) (e.g., 2 nm-100 nm size range) connected to each other through the network of carbon nanotubes.

The TCINs are located throughout the layer and may be in contact with one or more nanotubes. The size of the TCIN can be selected to be commensurate with the thickness of the hybrid layer. For example, the TCINs have a particle size of up to about 20 nm, such as, about 2-5 nm.

In certain embodiments, the upper surface of the hybrid film can further be deposited with transparent conductive oxide colloids (TCOC) in the size range of 1-2 nm. The TCOC may be prepared from $In_2O_3$:Sn, ZnO:F, $Cd_2SnO_4$, ZnO:Al, $SnO_2$:F, ZnO:Ga, ZnO:B, $SnO_2$:Sb, ZnO:In, and the like. In certain embodiments, the TCOC may not form a continuous film across the upper portion of the hybrid layer, but serve only to fill in certain regions that appear similar to voids to smoothen out the any surface roughness that may be present on the hybrid film. In certain embodiments, the mean thickness of the TCOC deposited on the upper portion of the hybrid layer may be of a sufficient thickness so that the mechanical strength (brittleness) is at an acceptable range (e.g., 1-2 nm thick).

Figure 6:
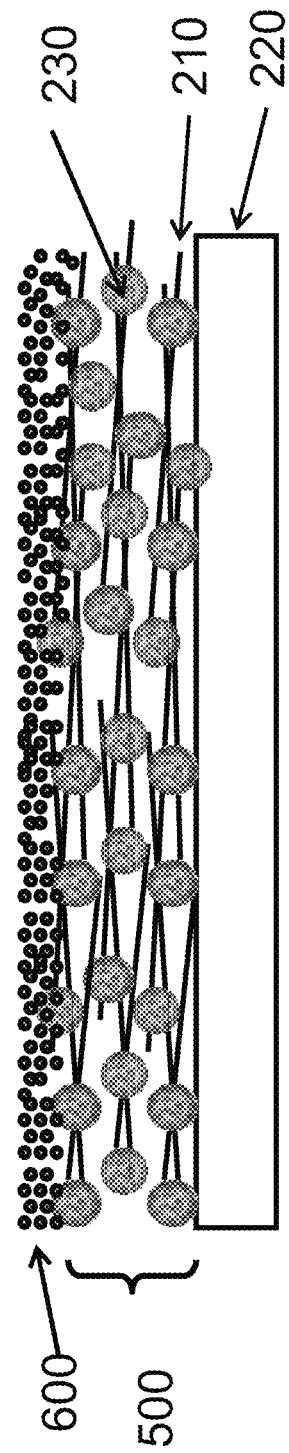
FIG. 6 is a schematic cross sectional view of a carbon nanotubes-TCIN hybrid film formed on a transparent substrate through multiple depositions followed by deposition of a top most layer of transparent conductive oxide colloids (TCOC) in the size range of <2 nm.

FIG. 6 is a cross sectional view of the schematic of such a structure showing TCOC 600 in the size range of <2 nm as the uppermost layer. The small particle size of the TCOC permits the colloidal particles to penetrate into the upper portion of the hybrid layer and to form a smooth upper surface. Such layer of TCOC can be utilized to reduce the RMS surface roughness of the hybrid film. For example, in OLED applications, it is desirable to have a surface roughness of less than 2 rms.

In one or more embodiments, instant films also have volume resistances in the range of about $10^{-2}$ ohms-cm to about $10^{10}$ ohms-cm. In other embodiments, the film has a surface resistance in the range of less than about $10^{10}$ ohms/square. Preferably, the film has a surface resistance in the range of about $100$-$10^{10}$ ohms/square. In other embodiments, the film has a surface resistance in the range of less than about 2000 or less than about 1000 ohms/square. For example, the film has a surface resistance in the range of about 10 to about 2000 ohms/square.

In one or more embodiments, devices including the hybrid layer demonstrate excellent transparency and low haze. For example, the instant film has a total transmittance of at least about 60% or 70% (such as 75-95%) and a haze value of visible light of about 2.0% or less. In some embodiments, the instant films have a haze value of 0.5% or less. Total light transmittance refers to the percentage of energy in the electromagnetic spectrum with wavelengths less than $1 \times 10^{-2}$ cm that passes through the films, thus necessarily including wavelengths of visible light.

Without wishing to be bound by theory, such hybrid layer having discrete TCIN connected through a three-dimensional network of carbon nanotubes may offer significant advantages over other morphologies, such as a multilayer films having a separate carbon nanotube layer and a separate TCO layer. For example, the TCINs can increase the conductivity of the layer due to their inherent conductivity and/or by creating an electrical shunt across high contact resistance CNT-CNT junctions without causing any loss of optical transmission in the conductive film.

In contrast, in a multilayered structure having distinct CNT layers and ITO layers, electric current would tend to flow through the least resistive layer, mostly ignoring the more resistive layer. Such effect would negate any synergistic advantages that may be obtained by the hybrid layer of the present invention. Secondly, the ITO layer would suffer from the poor mechanical strength of individual ITO films. The ITO layer could further develop cracks, defects, pin holes, and the like and change the properties of the laminated stack in an undesirable way. Moreover, the optical and electrical properties of TCIN are heavily dependent on their mean particle size. Therefore, efforts to match the optical and electrical properties of the TCO layer with that of adjoining CNT layer poses a significant challenge because the resulting layer will inevitably have a different optical/electrical properties from that of the starting TCIN.

Suitable Materials for Forming CNT-TCIN Hybrid Films

To make the hybrid transparent conductive films with one component being carbon nanotubes, any conductive material having sufficient electrical conductivity even at nanoscale dimensions and optical transparency may be used. By way of example, suitable TCINs include ITO, ZnO, $Cd_2SnO_4$, $ZnSnO_3$, among others. Exemplary conductive metal oxides are listed below in Table 1. Mixtures of different TCINs may be used. In particular, the transparent conductive inorganic nanoparticle can be ITO.

TABLE 1

Metal oxides and their electrical and optical properties.

| Material | Sheet Resistance ($\Omega/\square$) | Visible Absorption Coefficient |
|---|---|---|
| $In_2O_3$: Sn | 6 | 0.04 |
| ZnO: F | 5 | 0.03 |
| $Cd_2SnO_4$ | 7.2 | 0.02 |
| ZnO: Al | 3.8 | 0.05 |
| $SnO_2$: F | 8 | 0.04 |
| ZnO: Ga | 3 | 0.12 |
| ZnO: B | 8 | 0.06 |
| $SnO_2$: Sb | 20 | 0.12 |
| ZnO: In | 20 | 0.20 |

Source: R. G. Gordon, MRS Bulletin, August 2000

The bulk resistivity of the transparent conductive oxides in their nanoparticle form can be more than 3 orders larger than their bulk resistivity in the macroscopic solid or thin film form. The bulk resistivity range of the optical transparent conductors may be in the range of 1-1000 $\mu\Omega \cdot cm$ and their plasma wavelength can be as low as below 0.4 $\mu m$ to more than >1 $\mu m$.

The plasma frequency is the frequency above which the charge carriers do not respond to the electromagnetic radiation and the material behaves as a transparent dielectric. Below the plasma frequencies, the TCO reflects and absorbs the incident radiation. For most transparent conductive materials, the plasma frequency falls in the near-IR region of the electromagnetic radiation (R. G. Gordan, MRS Bulletin, August 2000).

In certain embodiments, TCINs diameters can range from few ten nanometers to few microns. In other embodiments, the TCINs can be monodisperse in size.

In some other embodiments, the TCINs can have any desirable shapes, such as spherical, oblong, prismatic, ellipsoidal, irregular objects, or in the form of nanorods. In the form of a nanorod the diameter of the rods can range from a few nanometers to several tens of nanometers. Their aspect ratio can be as low as 5 to few thousand.

In certain embodiments, certain TCINs having an aspect ratio that is larger than 1 can lower the percolative conduction threshold for interconnection of the TCINs through a carbon nanotube network, thus improving optical transparency further.

The TCINs can be formed in the form of oxide sols by the hydrolysis of the corresponding metal-organic precursors. The mean diameter, size dispersity, and aspect ratios of the TCINs can be controlled by various factors like concentrations, temperature and duration of the reaction.

In certain embodiments, the interactions between CNT and TCIN can be tailored to exhibit certain attractive interactions with each other through van der Waals interactions, covalent interactions, electrostatic interactions, ionic interactions, and/or any other suitable interactions.

For example, the CNTs and TCIN can be derivatized to carry electrical charges of specific polarity (e.g., positive or negative charges). For example, silylation of the surface of the TCINs with aminopropyl trimethoxy silane can form an amine terminated surface that is negatively charged. In contrast, derivatizing the TCIN with alkyl bromide terminal groups can render them positively charged.

In some other embodiments, TCINs can be functionalized with a significant concentration of surface chemical species like hydroxyl groups that can then be used for the organic derivatization of the TCINs. The TCINs can be modified further to impart other chemical functionalities, as would be readily apparently to one of ordinary skill in the art. Some non-limiting examples of chemical functionalities that may appear natively, or those that can be prepared on surfaces of the TCINs include —OH, —COOH, —NH$_2$, ether, ester, amide, —Cl, —Br, and the like functional groups In some other embodiments, the surface chemistry of the transparent conductive oxide can be tailored to tether to the surface of the single walled carbon nanotubes through a covalent bonding.

In one or more embodiments, the nanotubes comprise single walled carbon-based SWNT-containing material. SWNTs can be formed by a number of techniques, such as laser ablation of a carbon target, combustion of hydrocarbon fuels, decomposing a hydrocarbon, and setting up an arc between two graphite electrodes. For example, U.S. Pat. No. 5,985,232 to Howard et al. describes a method for the production of nanotubes, in which unsaturated hydrocarbon fuel and oxygen are combusted in a burner chamber at a subatmospheric pressure, thereby establishing a flame. For example, U.S. Pat. No. 5,424,054 to Bethune et al. describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are contemplated, for instance laser heating, electron beam heating and RF induction heating. Smalley (Guo, T., Nikoleev, P., Thess, A., Colbert, D. T., and Smally, R. E., Chem. Phys. Lett. 243: 1-12 (1995)) describes a method of producing single-walled carbon nanotubes wherein graphite rods and a transition metal are simultaneously vaporized by a high-temperature laser. Smalley (Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996)) also describes a process for production of single-walled carbon nanotubes in which a graphite rod containing a small amount of transition metal is laser vaporized in an oven at about 1200° C. Single-wall nanotubes were reported to be produced in yields of more than 70%. U.S. Pat. No. 6,221,330, which is incorporated herein by reference in its entirety, discloses methods of producing single-walled carbon nanotubes which employs gaseous carbon feedstocks and unsupported catalysts.

In certain embodiments, the CNT networks can be formed using long nanotubes, such as nanotubes having a length longer than 1, 2, 3, 4, or 5 microns. In other embodiments, the CNT networks can be formed using predominantly metallic nanotubes or predominantly semiconducting nanotubes, or a mixture thereof. In some other embodiments, the nanotubes can be selected so that the work function (i.e., the minimum energy required to remove an electron from the surface of a particular material) of the nanotubes are matched with the work function of the TCINs.

Carbon nanotubes may also be obtained in the form of a dispersion to provide a CNT ink. Examples of such CNT dispersions are commercially available from Brewer Science, Rolla, Mo. and Carbon Solutions, Inc., Riverside, Calif. among others. Alternately the CNT dispersions can be tailor made by prior art methods or proprietary custom methods starting from raw carbon nanotubes.

The electronic structure of the single walled carbon nanotubes and their affinity to the coated substrate and the transparent conductive oxide nanoparticles can also be modified by chemical derivatization with one or more of organic functional groups of similar or different types.

The substrate can be any conductive or non-conductive material, for example, metals, silicon, silicon oxide, plastics, organic polymers, inorganic polymers, glasses, crystals, composite material, etc. The substrate for example, maybe, transparent, semi-transparent, translucent, or opaque.

Methods for Forming CNT-TCIN Hybrid Films

The CNT-TCIN hybrid films can be applied to a substrate from suspension using any suitable solvent. The CNT-TCIN hybrid films can be formed by an alternating deposition of CNT and TCINs from their respective dispersions.

In certain embodiments, the CNT dispersion having from about 0.005 wt % to 1 wt % CNT in a suitable solvent can be utilized. In certain embodiments, TCIN dispersions having about 0.005 wt % to 1 wt % TCIN in a suitable solvent can be utilized. As would e readily apparent to one of ordinary skill in the art, a suitable dispersion/solution concentration may be utilized as would be readily apparent to one of ordinary skill in the art.

The number of depositions alternating between the CNT and TCINs can be controlled as desired. For example, the proportion of CNT:TCIN may range from about 10:90 to 90:10 by weight. When low amounts of CNTs are present, the film may lose some of the flexibility and mechanical strength that are provided by the carbon nanotubes. When the amount of TCINs in the hybrid layer is low, the conductivity enhancement of the material is compromised. Therefore, the appropriate balance of materials is selected to provide the desired balance of mechanical and electrical properties in the layer.

The number of layers and the density of each layer may be selected to obtain a target surface coverage. In one or more embodiments, the relative surface coverage of the CNTs and the TCINs can range from about 10:90 to 90:10, and in some embodiments the surface coverage may be about 1:1. Total surface coverage may range from about 10% to about 100%. A typical monolayer may provide up to about 15% (of the CNT and TCIN combined) surface coverage.

If thicker layers are desired for lowering of the overall surface resistance, multiple hybrid layers can be applied to the substrate to achieve a thicker hybrid film (e.g., see FIG. 5).

Figure 7:
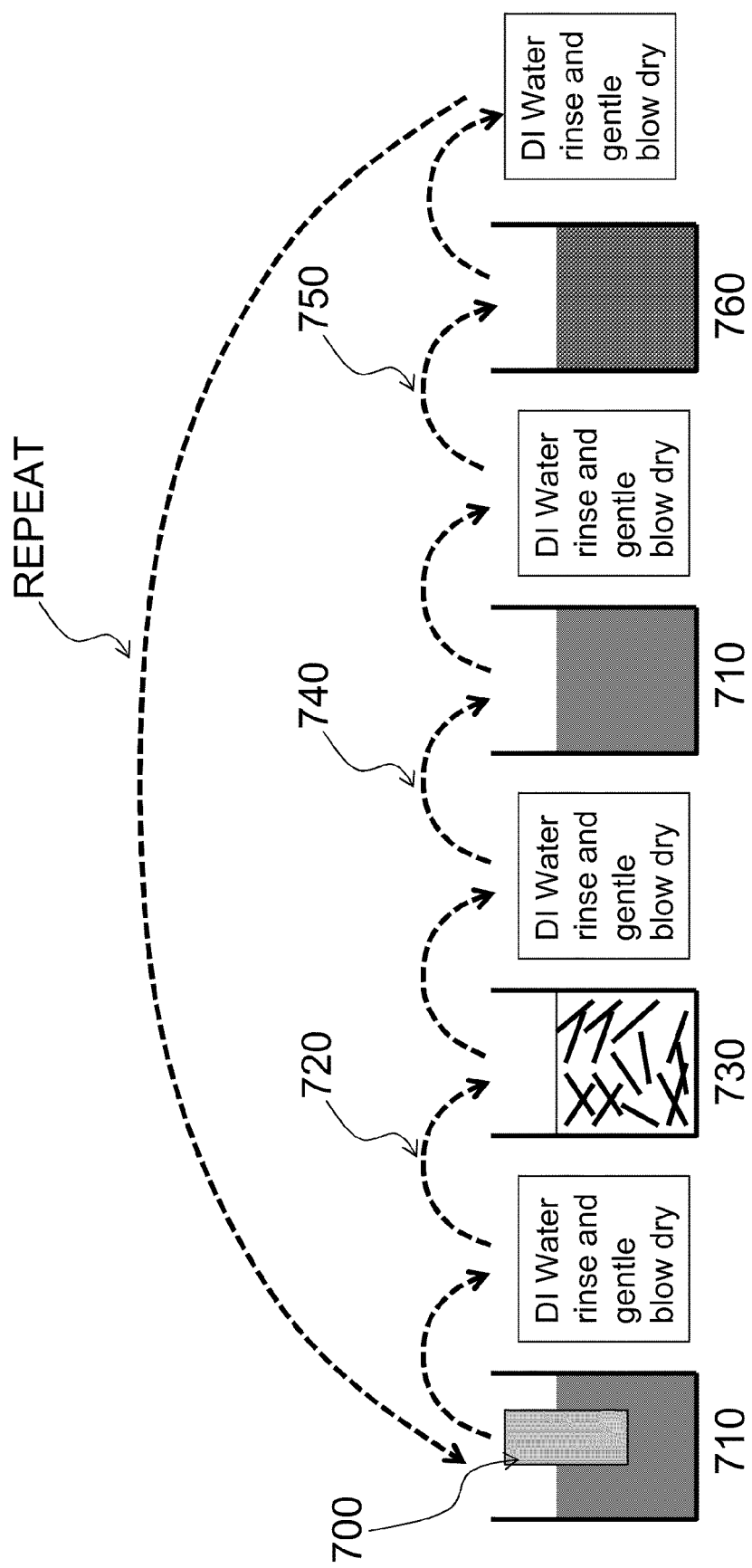
FIG. 7 is a schematic representation of an assembly process in accordance with certain embodiments of the present invention, where an intermediate polyelectrolyte is used to bond CNT and ITO nanoparticles that carry the same charge and dispersed in their respective solvents.

Additional binder materials can be utilized to assemble the desired CNT-TCIN structures. FIG. 7 shows one embodiment to assemble the CNT-TCIN hybrid film of the present invention. As shown therein, a transparent substrate 700 can be pretreated with a binder material 710, such as a polymer, oligomer, a small organic molecule, a large organic molecule or a polyelectrolyte carrying one particular charge (e.g., positively charged). After a rinse and dry cycle, the substrate having the binder can be immersed into a CNT solution 730 (step 720), where the CNTs may be charged oppositely to that of the binder material (e.g., negatively charged). After a rinse and dry cycle, the CNT coated substrate can then be immersed in the binder material 710 again (step 740), followed by another rinse and dry cycle. Thereafter, the coated substrate can be immersed in a TCIN solution 760 (step 750), where the TCINs may be charged oppositely to that of the binder material (e.g., negatively charged, followed by a rinse and dry cycle. These steps can be repeated in a cyclic process as desired and as shown in FIG. 7. Such an embodiment may be particularly useful when the CNTs and TCINs both carry same electrical charge and the binder material carries an opposite charge.

Figure 8:
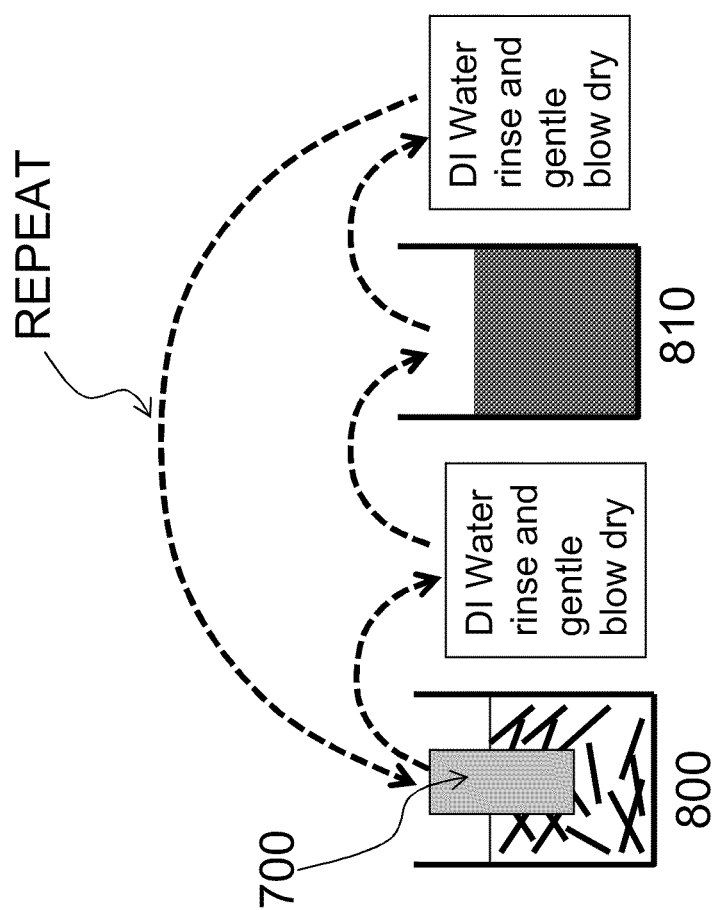
FIG. 8 is a schematic representation of an assembly process in accordance with certain embodiments of the present invention, where no intermediate polyelectrolyte is used to bond oppositely charged CNT and ITO nanoparticles dispersed in their respective solvents.

In another embodiment, where CNT and TCINs carry opposite charges in their respective solutions, the CNT-TCIN hybrid film can be formed without the use of any binder materials, as exemplified in FIG. 8. As shown therein, a transparent substrate 700 can be can be immersed into a CNT solution 800, where the CNTs may be charged positively or negatively. After a rinse and dry cycle, the CNT coated substrate can then be immersed in TCIN solution 810, where the TCINs are charged oppositely to that of the charge of the CNT in solution 800. After a rinse and dry cycle, these steps can be repeated in a cyclic process as desired and as shown in FIG. 8.

As illustrated, numerous different embodiments are within the scope of one of ordinary skill in the art to form the CNT-TCIN hybrid film of the present invention.

Without wishing to be bound by theory, the hybrid layer thus formed is distinguished from a hybrid layer formed by depositing from a single dispersion because:

(a) the conditions required for forming stable dispersions of TCINs can be distinct from conditions required for forming stable dispersions of CNT (e.g., choice of solvent, pH, ionic strength, concentrations, etc.). The conditions required for each dispersion may be incompatible, leading to instant flocculation of one or the other species on standing; and (b) the conditions for the application of a coating of transparent conductive inorganic nanoparticles from a solution may be incompatible with the conditions required for application of a coating of CNT from a stable dispersions (e.g., surface treatment, temperature, flow stability, etc.). The incompatible conditions may lead to flocculation of one or the other species during coating.

Furthermore, without wishing to be bound by theory, the successive deposition steps described in FIGS. 7 and 8 can be carried out under suitable conditions (e.g., at certain concentration of inks, deposition rate, temperature, viscosity, etc.) that advantageously form the morphology of the present invention (e.g., see FIGS. 3 and 4) rather than the multilayer films described in the conventional art. For instance, by using charged TCINs, the TCIN can be made to repel each other and the low solution concentrations utilized can ensure preventing agglomeration of the TCINs to prevent formation of a continuous layer as in the conventional art. Such a technique of the present invention is distinguished from the various spray painting, spin coating, knife coating, ink jet printing and the like techniques that would generally form continuous films.

Applications

The wavelength range for consideration of the optical properties of the CNT-TCIN hybrid films thus fabricated may be deep UV-UV (190-400 nm), visible (400-800 nm), or infrared radiations 800-1800 nm) or their combinations in continuous or discrete segments. The CNT-TCIN hybrid films may have numerous applications ranging from OLED, heat mirrors in buildings, optical modulators, touchscreens, RF antennas, RF tags, and numerous other commercial and military applications.

EXAMPLES

Example 1

Preparation of the CNT INK from As-Produced CNT

The CNT ink consisting of negatively charged, unpurified carbon nanotubes was prepared by adding 100 mg of as produced commercial single walled carbon nanotubes to a solution of 200 mg of polystyrene sulfonate in 100 ml of deionized water. The mixture was sonicated for 12 h in a bath sonicator. The mixture was left untouched for 48 hours and the supernatant liquid was decanted and bottled.

Example 2

Preparation of CNT-INK from Purified CNT

The CNT ink consisting of negatively charged, purified CNT, was prepared by adding 50 mg of commercial single walled carbon nanotubes obtained as purified to a solution of 200 mg of polystyrene sulfonate in 100 ml of deionized water. The mixture was sonicated for 12 h in a bath sonicator. The mixture was left untouched for 48 hours and the supernatant liquid was decanted and bottled.

Example 3

Preparation of ITO-INK

The ITO ink consisting of negatively charged ITO nanoparticles was prepared by adding 50 mg of as received commercial ITO nanoparticles having an average size of 50 nm (Alfa-Aesar) to 100 ml of deionized water. The pH of the solution was adjusted to 3 by the addition of hydrochloric acid. The mixture was sonicated in a bath sonicator for 1 h and it formed a shelf stable suspension. The mixture was used as such with no further centrifugation or decanting steps.

Example 4

Preparation of Polymer Adhesive Ink

The polymer ink, with a positively charged polymer to serve as a binder material between the CNT and ITO nanoparticles, was prepared by dissolving a 0.1% by weight portion of 2-hydroxy ethylcellulose (M. Wt 1,300,000) in deionized water.

Example 5

Preparation of 6-5 Layer Stack Using CNT INK from As Produced CNT

The schematics of the layer by layer deposition of ITO and CNT is shown in FIG. 7. A precleaned glass substrate (700) was dipped in the polymer ink for two minutes, followed by rinsing in DI water, followed by dipping for two minutes in CNT ink (730), followed by rinsing in DI water. The substrate was dried with a gentle blow of air after each DI water rinse. Then, the coated substrate was dipped in the polymer ink again, followed by dipping for two minutes in the ITO ink (760). The substrate again was rinsed with DI water and air-blow dried before repeating the process all over as shown in FIG. 7. The CNT-ITO hybrid film was obtained after such alternate addition of five layers each of CNT and ITO respectively.

The sheet resistance and optical transparency of the samples were measured as follows, after the addition of each layer of CNT, ITO and the polymer.

The electrical resistance of the films were measured employing the four probe electrical equipment Lucas S-302-4 four point probe station with the SP4-40085TBY tip. The station was connected to an Agilent 3440A digital multimeter for measuring resistance. The observed resistance values were multiplied by a geometric correction factor of 4.53 to obtain the reported sheet resistances expressed in units of ohms/square. Optical properties of the transparent conductive films were measured employing a Agilent Technologies 8453 UV-Vis Chem Station spectrophotometer. The reported transmittance values were observed at a wavelength of 550 nm.

Figure 9:
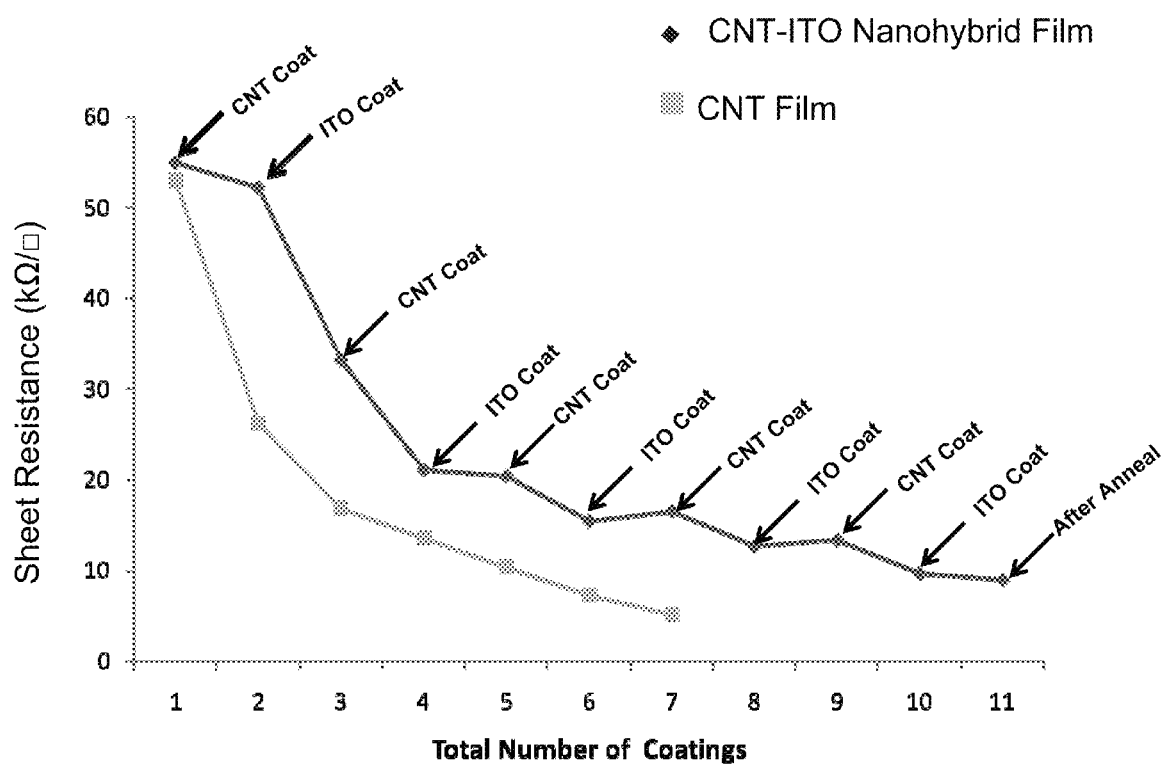
FIG. 9 shows the decrease of sheet resistance as a function of successive coatings of the CNT film and a CNT-ITO hybrid film fabricated in accordance with certain embodiments of the present invention.
Figure 10:
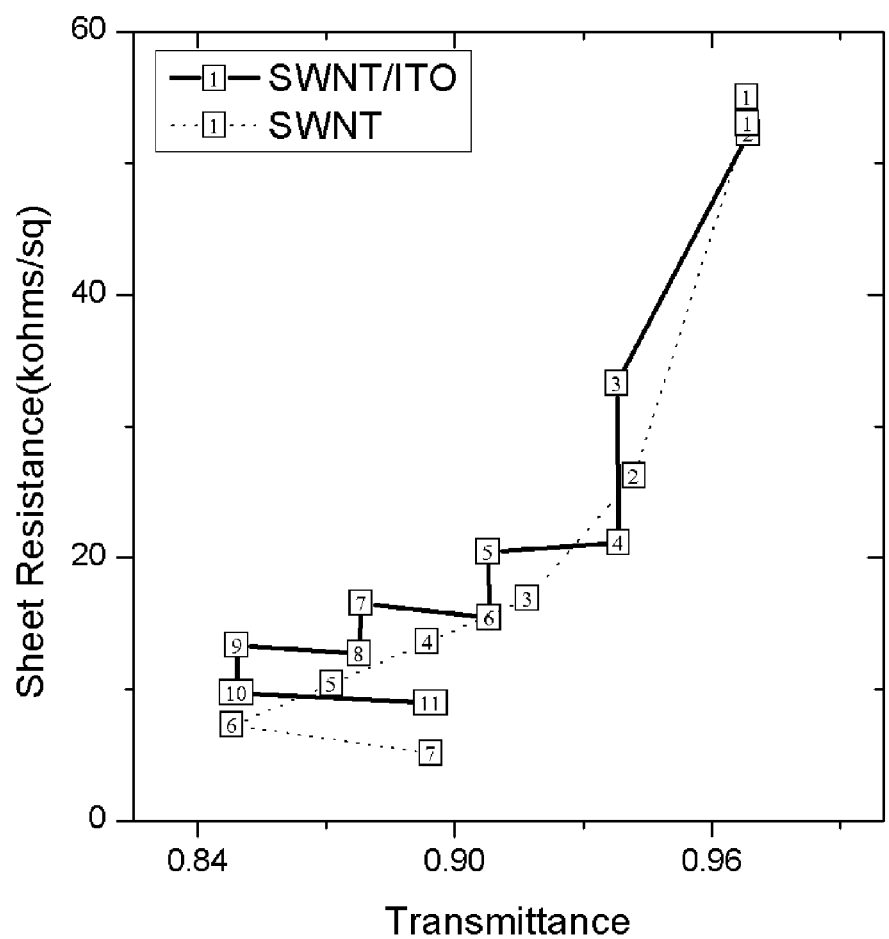
FIG. 10 is a comparison of sheet resistance and transmittance for a CNT film made from as produced carbon nanotubes and a CNT-ITO hybrid film fabricated in accordance with certain embodiments of the present invention.

The decrease in the sheet resistance with alternate addition of CNT and ITO coatings in the case of the hybrid film and that of a CNT-only control film is shown in FIG. 9. The sheet resistance-transmittance data for the same set of films are shown in FIG. 10. The continuous line represents the CNT-ITO hybrid film and the dotted line represents the CNT-only film. In the case of the hybrid film in FIG. 10, data points 1, 3, 5, 7 and 9 represent the CNT deposition and 2, 4, 6, 8, and 10 represent the ITO deposition on top of the CNT network. FIGS. 9 and 10 demonstrate that a hybrid system is constructed through the electrical "wiring" of ITO nanoparticles by the conductive carbon nanotubes.

Control experiments conducted under identical conditions with a film made using only ITO nanoparticles ink (up to 8 coatings) and polymer ink resulted in an electrically non-conductive system (infinite sheet resistance) further proving the three dimensionally interconnected electrical "wiring" of ITO nanoparticles by CNT in the hybrid film.

The hybrid film was then annealed in an air oven at 300° C. for 1 hour to burn away the polymer. The polymer ink which was present as an extraneous impurity is partially eliminated by thermal annealing resulting in a more transparent and less electrically resistive film represented by the data point 11 in the case of the CNT-ITO hybrid.

The control sample of containing only the ITO nanoparticles (up to 8 coatings) was also annealed and again showed infinite sheet resistance, proving that the polymeric binder material was not the cause of the observed electrical property in the control sample.

Example 6

Structure and Morphology

The surface morphology of the CNT-ITO hybrid film, after the annealing step, was examined by scanning electron microscopy at different magnifications, employing an FEI Nova Nanolab dual beam FIB/SEM.

Figure 11:
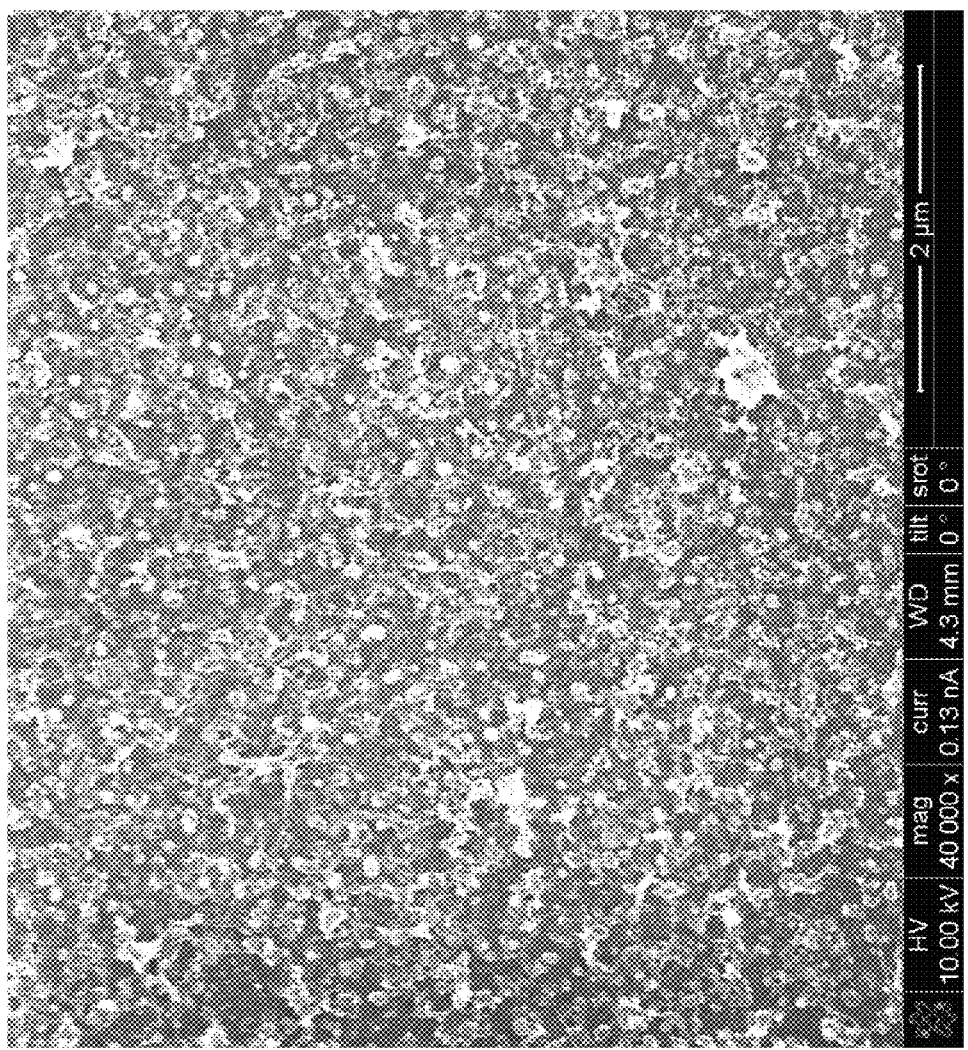
FIG. 11 a shows Scanning Electron Micrograph (40,000×) of a CNT-ITO hybrid film assembled in accordance with certain embodiments of the present invention.
Figure 12:
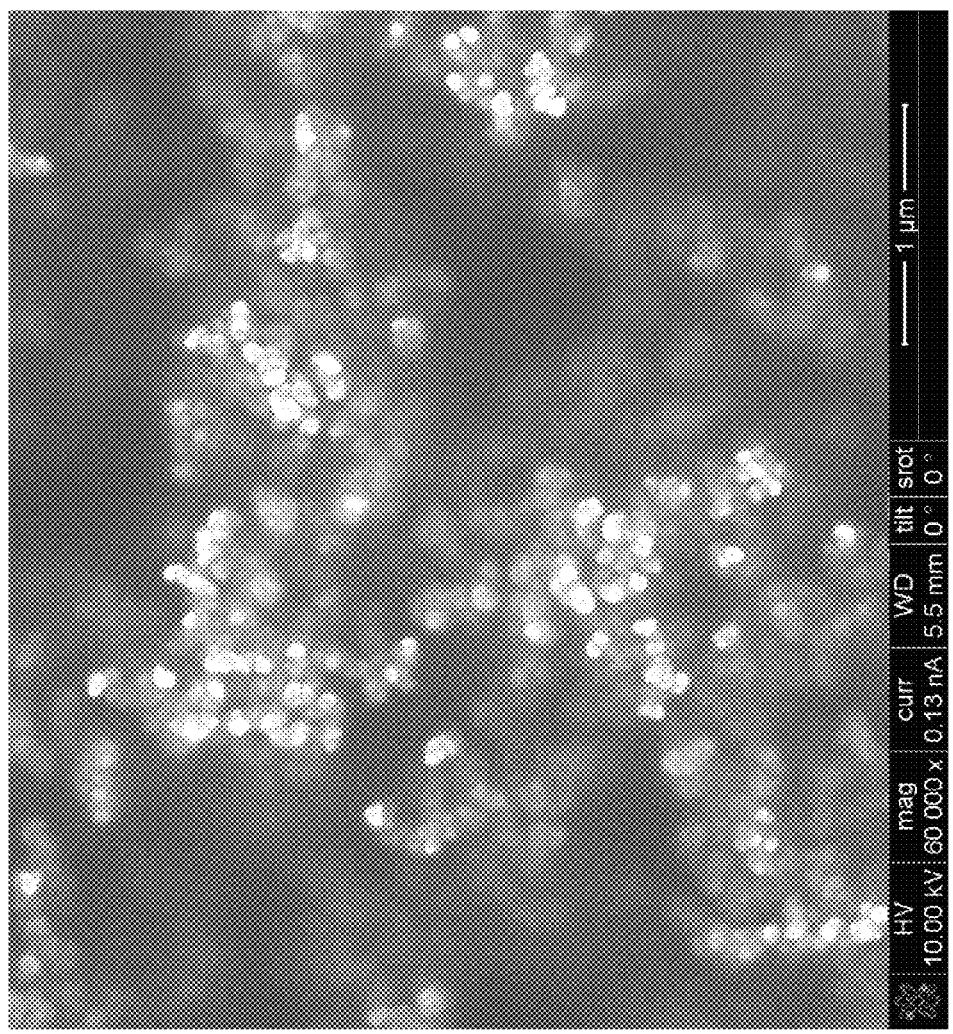
FIG. 12 shows a Scanning Electron Micrograph (60,000×) of a CNT-ITO hybrid film assembled in accordance with certain embodiments of the present invention.

The scanning electron micrographs of the CNT-ITO hybrid film with ITO as the top layer at 40,000× and 60,000× magnifications respectively are shown in FIGS. 11 and 12 respectively.

Example 7

Preparation of 6-5 Layer Stack Using CNT INK from Purified CNT

Figure 13:
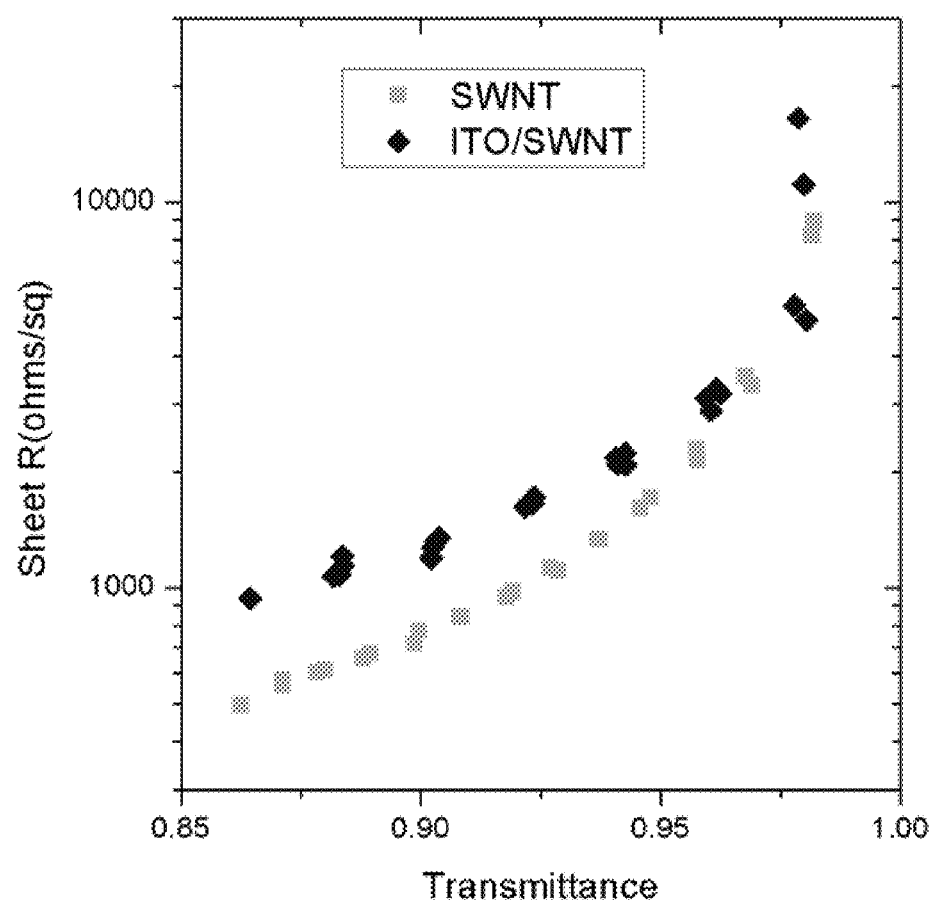
FIG. 13 shows a comparison of the sheet resistance and transmittance for a CNT film and a CNT-ITO hybrid film made from purified carbon nanotubes assembled in accordance with certain embodiments of the present invention.

A precleaned glass substrate was dipped in the polymer ink for two minutes, followed by rinsing in DI water, followed by dipping for two minutes in CNT ink made from the purified CNT, and followed by rinsing in DI water. The substrate was dried with a gentle blow of air after each DI water rinse. Then, the coated substrate was dipped in the polymer ink again, followed by dipping for two minutes in the ITO ink. The substrate again was rinsed with DI water and air-blow dried before repeating the process all over again until 7 coatings of purified CNT ink and 6 coatings of ITO ink were placed alternately. Electrical and transmission measurements were made as described in the previous examples. The final hybrid film showed a sheet resistance of less than 1000 ohms/square at an optical transmittance of more than 0.85 as shown in FIG. 13.

Example 8

Preparation of CNT-ITO Hybrid Deposited on a Flexible Plastic Substrate

Figure 14:
FIG. 14 shows the photograph of a CNT-ITO hybrid film coated on a flexible PET substrate.

A 3"×1" sized polyethylene terephthalate (PET) substrate cut from a commercial film sample was dipped in the polymer ink for two minutes, followed by rinsing in DI water, followed by dipping for two minutes in CNT ink (730), followed by rinsing in DI water. The substrate was dried with a gentle blow of air after each DI water rinse. Then, the coated substrate was dipped in the polymer ink again, followed by dipping for two minutes in the ITO ink (760). The substrate again was rinsed with DI water and air-blow dried. This process was repeated until a hybrid film with 9 coatings of CNT and 8 coatings of ITO were alternated to form the final sample. The sample exhibited an optical transmittance of 85% and surface resistance of 1500 ohms/square. A photograph of a portion of the hybrid film cut from the 3"×1" substrate is shown in FIG. 14.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. An optically transparent, electrically conductive hybrid film consisting essentially of:
   a carbon nanotube (CNT) network, and
   a population of indium tin oxide particles distributed throughout the carbon nanotube network to provide a conductive transparent nanoscale hybrid film,
   wherein the hybrid film has a surface resistance that is less than $10^6$ Ohm/square and the optical transparency of the hybrid film is greater than about 70%,
   wherein the hybrid film is prepared by the process comprising
   providing a first suspension of carbon nanotubes in a first solvent;
   providing a second suspension of indium tin oxide particles in a second solvent;
   applying the first suspension of carbon nanotubes to a substrate to form a carbon nanotube network;
   applying the second suspension of indium tin oxide particles to the substrate; and
   repeating said applying first suspension and said applying the second suspension to form a population of indium tin oxide particles distributed throughout the carbon nanotube network,
   wherein the carbon nanotubes in the first suspension and the indium tin oxide particles in the second suspension carry opposite electrical charge.

2. The hybrid film of claim 1, wherein the carbon nanotubes are chemically derivatized.

3. The hybrid film of claim 1, wherein the indium tin oxide particles are pristine or chemically derivatized.

4. The hybrid film of claim 1, further comprising:
   a coating of colloidal transparent conductive inorganic-disposed on the upper surface of the hybrid film, said colloidal transparent conductive nanoparticles having a particle size less than the indium tin oxide particles.

5. The hybrid film of claim 4, wherein the RMS surface roughness of the hybrid film is less than about 2 nm.

6. The hybrid film of claim 1, wherein the indium tin oxide particles have an aspect ratio of about 1 to about 5.

7. The hybrid film of claim 1, wherein the indium tin oxide particles are spherical, oblong, prismatic, ellipsoidal, rods, and irregularly shaped.

8. The hybrid film of claim 1, wherein the optical transparency of the hybrid film is between about 75-95% and the surface resistance of the hybrid film is about 10-2000 ohms/square.

9. The hybrid film of claim 1, wherein the ratio of the amount of CNT:indium tin oxide particles range from about 10:90 to about 90:10 by weight.

10. The hybrid film of claim 1, wherein the thickness of the hybrid film range from about 2 nm to about 100 nm.

11. The hybrid film of claim 1, wherein the surface coverage of the hybrid film is greater than about 10%.

12. A hybrid film of claim 1, wherein the hybrid film further comprises a coating of the colloidal transparent conductive inorganic nanoparticles disposed on the upper surface of the hybrid film.

13. The hybrid film of claim 1, wherein the hybrid film has a surface resistance that is less than 2000 Ohm/square.

14. The hybrid film of claim 1, wherein the indium tin oxide particles are in the size range of about 2 nm-100 nm.

15. The hybrid film of claim 1, wherein the carbon nanotubes are single walled carbon nanotubes.

16. A method of preparing a hybrid film, the method comprising:
   providing a first suspension of carbon nanotubes in a first solvent;
   providing a second suspension of indium tin oxide particles in a second solvent;
   applying the first suspension of carbon nanotubes to a substrate to form a carbon nanotube network; and
   applying the second suspension of indium tin oxide particles to the substrate repeating said applying the first suspension and said applying the second suspension to form a population of indium tin oxide particles distributed throughout the carbon nanotube network,
  wherein the carbon nanotubes in the first suspension and the indium tin oxide particles in the second suspension are oppositely charged; and
  wherein the hybrid film has a surface resistance that is less than $10^6$ Ohm/square and the optical transparency of the hybrid film is greater than about 70%.

17. The method of claim 16, wherein the second suspension is applied after deposition of the first suspension.

18. The method of claim 16, further comprising applying a suspension of colloidal transparent conductive inorganic nanoparticles on the upper surface of the hybrid film, said colloidal transparent conductive nanoparticles having a particle size less than the indium tin oxide particles.

19. A method of preparing a hybrid film, the method comprising:
  providing a first suspension of carbon nanotubes in a first solvent;
  providing a second suspension of indium tin oxide particles in a second solvent;
  providing a third suspension or solution of a binder material capable of attracting the carbon nanotubes and indium tin oxide particles;
  applying the first suspension of carbon nanotubes to a substrate to form a carbon nanotube network; and
  applying the second suspension of indium tin oxide particles;
  applying the third suspension or solution of a binder material between said applying the first suspension of carbon nanotubes and said applying the second suspension of indium tin oxide particles;
  repeating said applying the first suspension, said applying the second suspension, and said applying the third suspension to form a population of indium tin oxide particles distributed throughout the carbon nanotube network; and
  rinsing away the binder material;
  wherein the carbon nanotubes in the first suspension and the indium tin oxide particles in the second suspension carry the same electrical charge and the binder material in the third suspension or solution carry opposite electrical charge from the electrical charges of the carbon nanotubes in the first suspension and the indium tin oxide particles in the second suspension; and
  wherein the hybrid film has a surface resistance that is less than $10^6$ Ohm/square and the optical transparency of the hybrid film is greater than about 70%.

20. The method of claim 19, further comprising applying a suspension of colloidal transparent conductive inorganic nanoparticles on the upper surface of the hybrid film, said colloidal transparent conductive nanoparticles having a particle size less than the indium tin oxide particles.

21. An optically transparent, electrically conductive hybrid film consisting essentially of:
  a carbon nanotube (CNT) network, and
  a population of indium tin oxide particles distributed throughout the carbon nanotube network to provide a conductive transparent nanoscale hybrid film,
  wherein the hybrid film has a surface resistance that is less than $10^6$ Ohm/square and the optical transparency of the hybrid film is greater than about 70%,
  wherein the hybrid film is prepared by the process comprising
  providing a first suspension of carbon nanotubes in a first solvent;
  providing a second suspension of indium tin oxide particles in a second solvent;
  providing a third suspension or solution of a binder material capable of attracting the carbon nanotubes and the indium tin oxide particles;
  applying the first suspension of carbon nanotubes to a substrate to form a carbon nanotube network; and
  applying the second suspension of indium tin oxide particles,
  applying the third suspension or solution of a binder material between said applying the first suspension of carbon nanotubes and said applying the second suspension of indium tin oxide particles;
  repeating said applying the first suspension, said applying the second suspension, and said applying the third suspension to form a population of indium tin oxide particles distributed throughout the carbon nanotube network; and
  rinsing away the binder material,
  wherein the carbon nanotubes in the first suspension and -indium tin oxide particles in the second suspension carry the same electrical charge and the binder material in the third suspension or solution carry opposite electric charge from the electric charges of the carbon nanotubes in the first suspension and the indium tin oxide particles in the second suspension.

22. A hybrid film of claim 21, wherein the hybrid film further comprises a coating of the colloidal transparent conductive inorganic nanoparticles disposed on the upper surface of the hybrid film.

23. The hybrid film of claim 21, wherein the indium tin oxide particles are in the size range of about 2 nm-100 nm.

24. The hybrid film of claim 21, wherein the carbon nanotubes are single walled carbon nanotubes.

25. An optically transparent, electrically conductive hybrid film consisting essentially of:
  a carbon nanotube (CNT) network, and
  a population of indium tin oxide particles distributed throughout the carbon nanotube network to provide a conductive transparent nanoscale hybrid film,
  wherein the optical transparency of the hybrid film is between about 75-95% and the surface resistance of the hybrid film is about 10-2000 ohms/square;
  wherein the hybrid film is prepared by the process comprising
  providing a first suspension of carbon nanotubes in a first solvent;
  providing a second suspension of indium tin oxide particles in a second solvent;
  applying the first suspension of carbon nanotubes to a substrate to form a carbon nanotube network;
  applying the second suspension of indium tin oxide particles; and
  repeating said applying first suspension and said applying the second suspension to form a population of indium tin oxide particles distributed throughout the carbon nanotube network,
  wherein the carbon nanotubes in the first suspension and indium tin oxide particles in the second suspension carry opposite electrical charge.

26. The hybrid film of claim 25, wherein the indium tin oxide particles have an aspect ratio of about 1 to about 5.

27. The hybrid film of claim 25, wherein the indium tin oxide particles are spherical, oblong, prismatic, ellipsoidal, rods, and irregularly shaped.

* * * * *